United States Patent [19]

Miller, Jr. et al.

[11] Patent Number: 4,901,762

[45] Date of Patent: Feb. 20, 1990

[54] LIQUID-PROPELLANT MANAGEMENT APPARATUS

[75] Inventors: John A. Miller, Jr., San Jose; R. K. Grove, Los Altos, both of Calif.

[73] Assignee: Lockheed Missiles & Space Company, Inc., Sunnyvale, Calif.

[21] Appl. No.: 251,736

[22] Filed: Oct. 3, 1988

[51] Int. Cl.[4] .................................................. B64G 1/00
[52] U.S. Cl. ...................................... 137/574; 137/590
[58] Field of Search ................. 137/154, 590, 574, 576

[56] References Cited

U.S. PATENT DOCUMENTS

| | | | |
|---|---|---|---|
| 4,399,831 | 8/1983 | Robert | 137/154 |
| 4,489,745 | 12/1984 | Netter | 137/209 |
| 4,553,565 | 11/1985 | Kerebel | 137/590 |
| 4,733,531 | 3/1988 | Grove | 137/154 X |
| 4,743,278 | 5/1988 | Yeh | 137/154 X |

*Primary Examiner*—Alan Cohan
*Attorney, Agent, or Firm*—John J. Morrissey

[57] ABSTRACT

A liquid-propellant tank for a spacecraft is symmetric about a longitudinal axis, and has a transverse partition (15) and a truncated conical partition (16), which divide the interior of the tank into a remote chamber (20), a proximate peripheral chamber (21) and a proximate axial chamber (22). Communication between the remote chamber (20) and the proximate peripheral chamber (21) is provided by a port structure (23), and communication between the proximate peripheral chamber (21) and the proximate axial chamber (22) is provided by a port structure (24). As liquid propellant is withdrawn from the tank, pressurant gas in the remote chamber (20) causes liquid propellant to pass from the remote chamber (20) into the proximate peripheral chamber (21) to replace liquid propellant thereby forced from the proximate peripheral chamber (21) into the proximate axial chamber (22), which replaces the liquid propellant withdrawn from the tank. Emptying of the three chambers in sequence limits the extent of migration of liquid propellant within the tank, thereby minimizing the effects of liquid-propellant migration on attitude stability of the spacecraft.

32 Claims, 4 Drawing Sheets

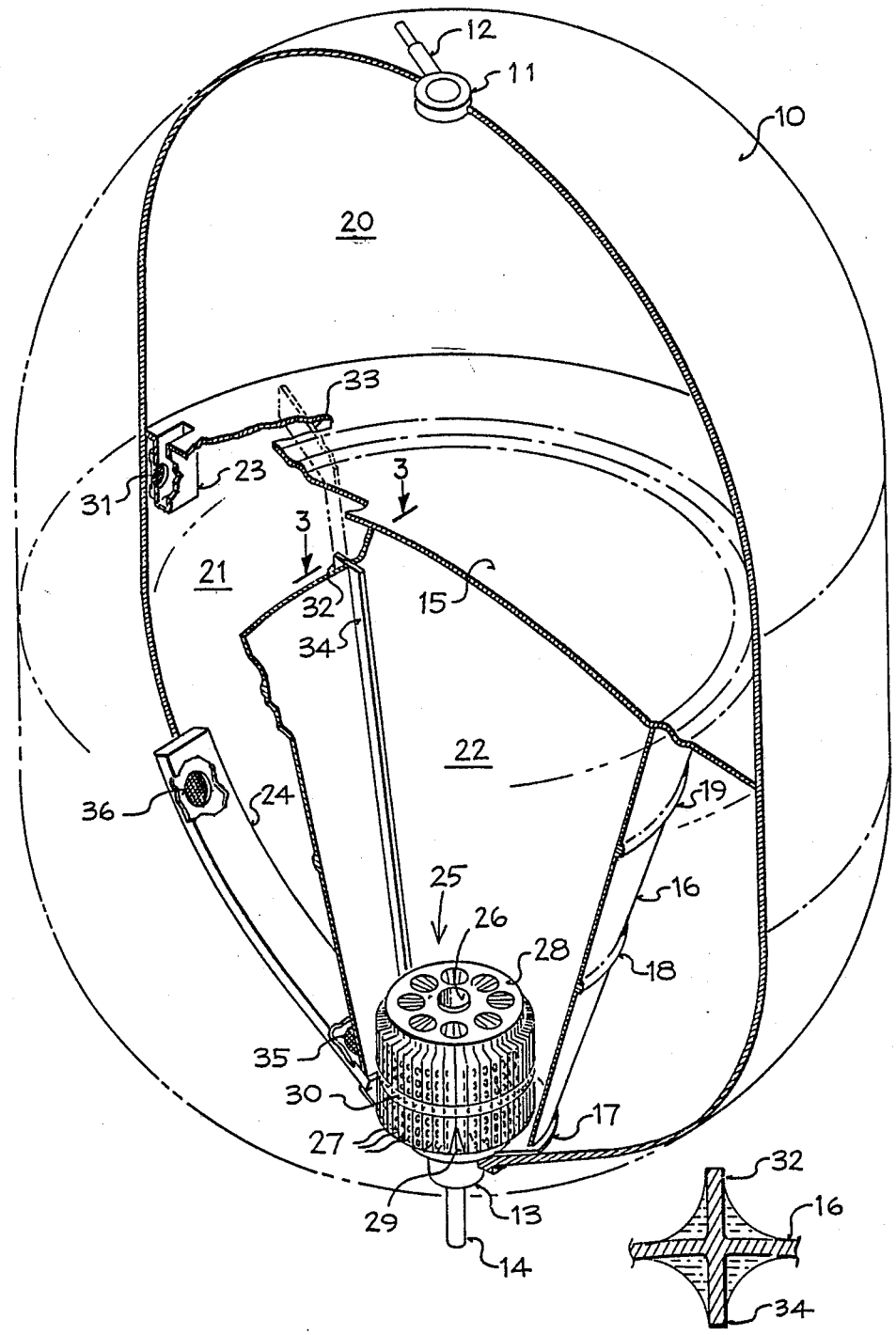
FIG_1   FIG_3

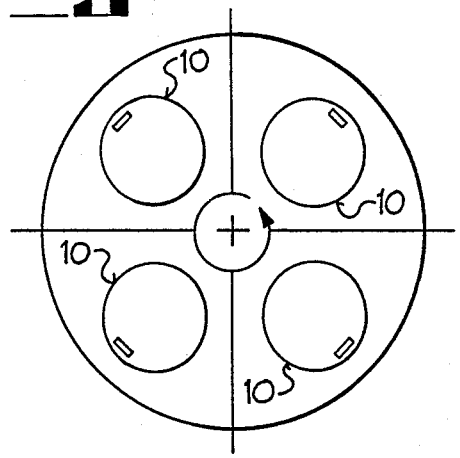
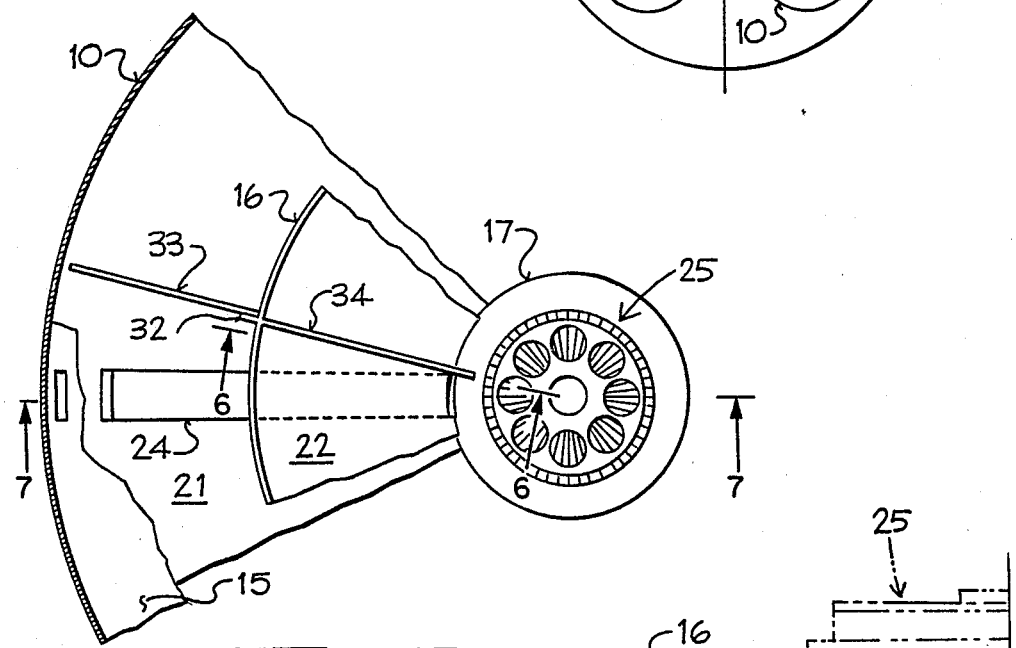
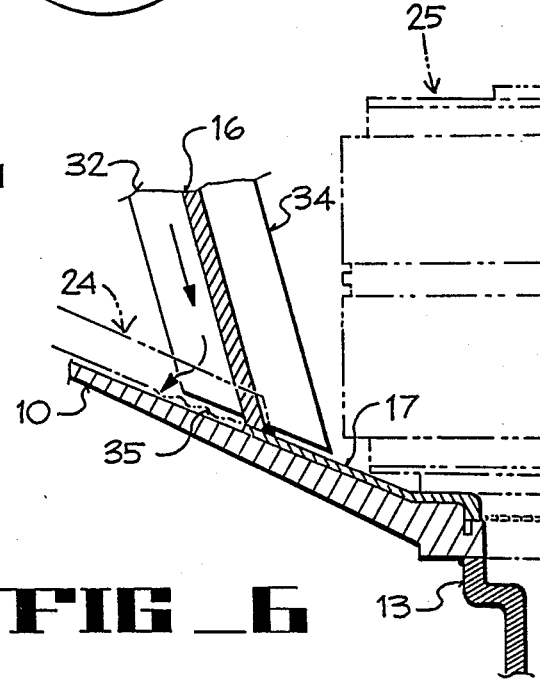

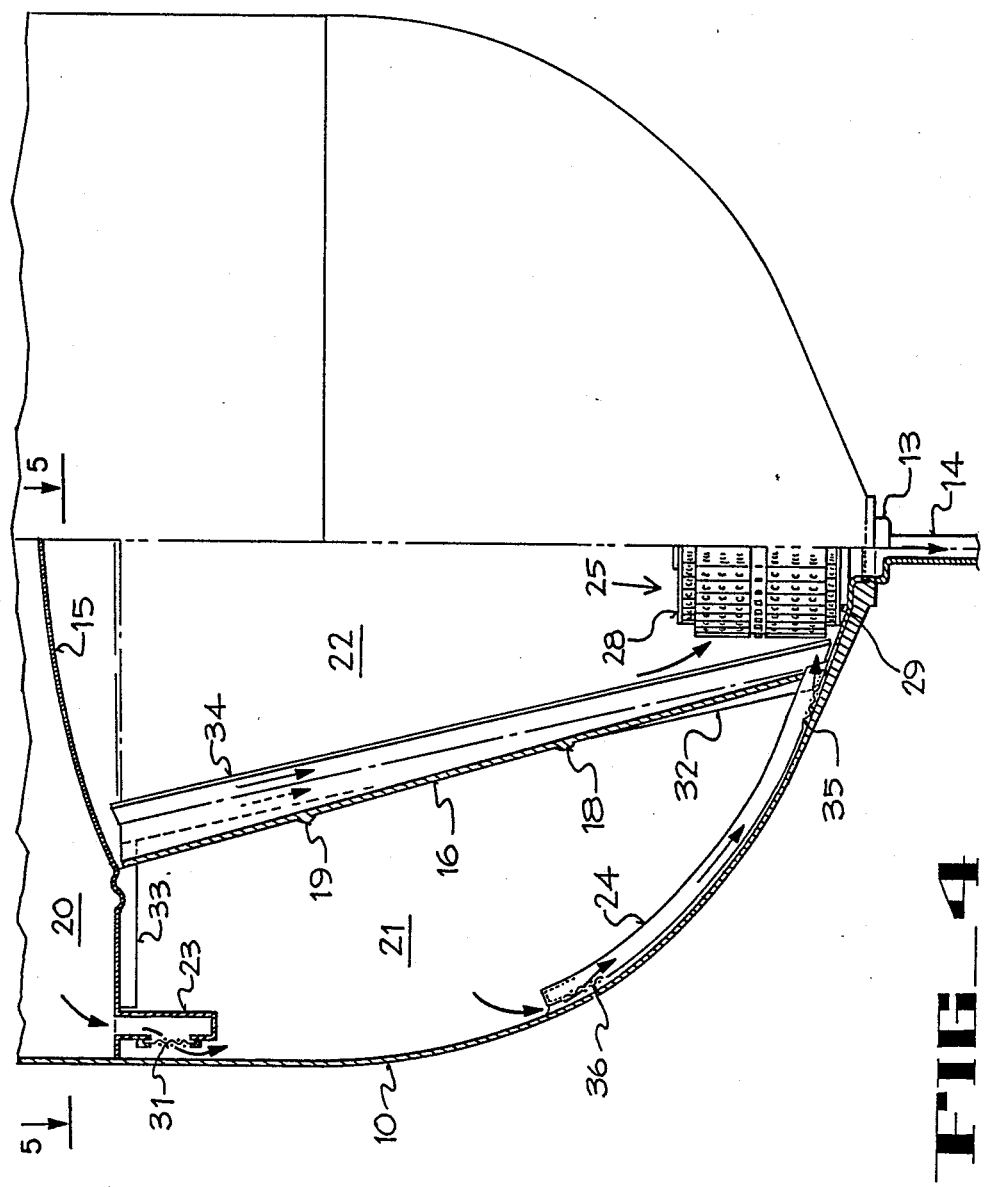

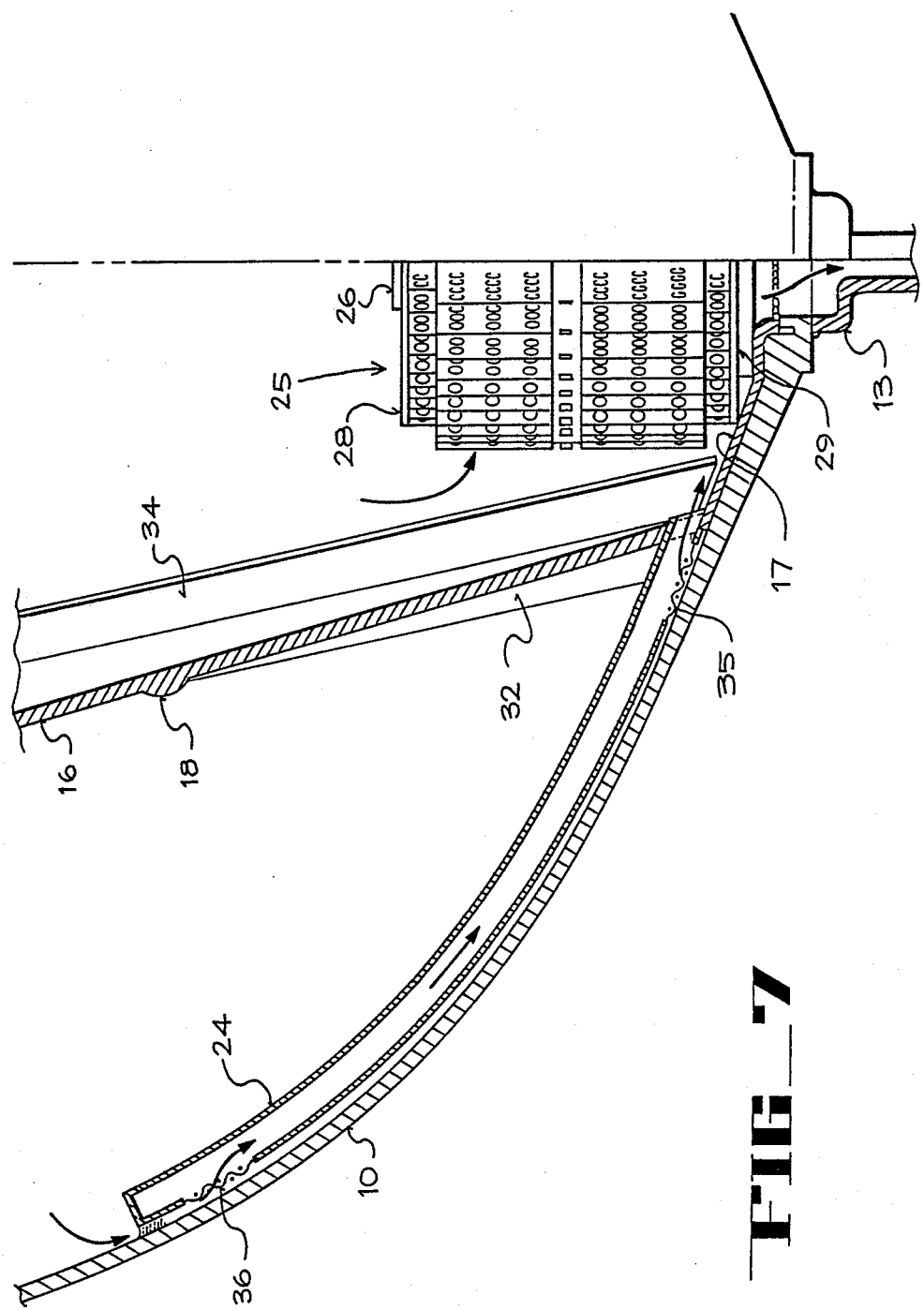

LIQUID-PROPELLANT MANAGEMENT APPARATUS

TECHNICAL FIELD

This invention relates generally to liquid management systems, and more particularly to an apparatus for delivering liquid propellant for a spacecraft from an on-board storage tank to motors of the spacecraft so as to minimize adverse effects on attitude stability of the spacecraft due to migration of the liquid propellant within the storage tank.

BACKGROUND OF THE INVENTION

In U.S. Pat. No. 4,715,399, a liquid-propellant management system is described, which can deliver substantially gas-free liquid propellant from a gas-pressurized storage tank to thrusters of a spacecraft without interruption during rapid changes in speed and/or direction of the spacecraft.

In U.S. Pat. No. 4,733,531, a technique involving capillary pumping vanes is described for collecting liquid propellant from remote regions of a gas-pressurized storage tank on a spacecraft to a trap positioned adjacent an outlet of the tank from which the liquid propellant is withdrawn from the tank for delivery to thrusters of the spacecraft.

Prior to the present invention, an unsolved problem in liquid-propellant management for spacecraft had been to minimize adverse effects on attitude stability of the spacecraft due to migration of liquid-propellant within an on-board storage tank.

SUMMARY OF THE INVENTION

It is an object of the present invention to minimize adverse effects on attitude stability of a spacecraft due to liquid-propellant migration within a storage tank on board the spacecraft.

In accordance with the present invention, the effects of sloshing and shifts in the center of mass of liquid propellant within a storage tank on board a spacecraft are minimized by configuring the tank so as to be substantially symmetrical about an axis that is generally parallel to a rotation axis of the spacecraft, and by partitioning the interior of the tank into three chambers, viz., (1) a remote chamber; (2) a proximate axial chamber; and (3) a proximate peripheral chamber, where the designations "remote" and "proximate" refer to locations of the chambers with respect to an outlet in a wall portion of the tank through which liquid propellant is withdrawn for delivery to a motor (or motors) of the spacecraft. An inlet line for pressurant gas can be attached by means of a conventional fitting to an inlet in a wall portion of the tank through which pressurant gas is introduced into the remote chamber. An outlet line for delivery of liquid propellant to the spacecraft motor (or motors) can be attached by a conventional fitting to the tank outlet. The inlet and outlet are preferably located at opposite ends of the axis of symmetry of the tank.

The proximate axial chamber of a liquid-propellant storage tank according to the present invention is defined by a partition of generally truncated conical configuration, which is symmetrically disposed about the axis of symmetry of the tank so that a smaller-diameter end of the partition surrounds the tank outlet. A sponge structure, which may be conventional (e.g., as described in the aforementioned U.S. Pat. No. 4,733,531), is secured within the proximate axial chamber in communication with the tank outlet. The proximate peripheral chamber surrounds the proximate axial chamber, and is likewise substantially symmetrical about the axis of symmetry of the tank. The remote chamber is also symmetrically disposed with respect to the axis of symmetry of the tank, and is separated from the proximate axial and peripheral chambers by a partition extending across the interior of the tank transversely with respect to the axis of symmetry.

The remote chamber communicates with the proximate peripheral chamber, and the proximate peripheral chamber communicates with the proximate axial chamber. There is no direct communication between the remote chamber and the proximate axial chamber. As liquid propellant is withdrawn from the sponge adjacent the tank outlet for delivery via the outlet line to the spacecraft motor (or motors), pressurant gas forces liquid propellant from the remote chamber into the proximate peripheral chamber. Liquid propellant entering the proximate peripheral chamber from the remote chamber expels an equal volume of liquid propellant from the proximate peripheral chamber into the proximate axial chamber to replace liquid propellant that has been drawn from the proximate axial chamber into the sponge, thereby replenishing the liquid propellant that has been withdrawn from the sponge through the outlet line.

A port structure is mounted on the transverse partition extending across the interior of the tank to provide communication between the remote chamber and the proximate peripheral chamber. A porous screen on the port structure retains liquid propellant by surface tension, thereby forming a barrier to passage of pressurant gas from the remote chamber into the proximate peripheral chamber as long as sufficient liquid propellant remains in the remote chamber to wet the screen.

An arcuate duct, which is open at one end and closed at the other end, is fixedly positioned within the proximate peripheral chamber. The open end of the duct is aligned with an opening in the truncated conical partition separating the proximate peripheral chamber from the proximate axial chamber. The opening in the truncated conical partition is located adjacent the sponge. The arcuate shape of the duct generally conforms to the shape of the interior wall of the tank in the vicinity of tank outlet, and the duct is spaced apart from the interior wall of the tank within the proximate peripheral chamber by a capillary distance. The separation between the arcuate duct and the interior wall of the tank is greatest at the closed end of the duct, and decreases toward the opening in the truncated conical partition so that liquid propellant collecting between the duct and the interior wall of the tank is pumped by capillary action toward the opening in the truncated conical partition. Openings on a surface of the arcuate duct facing the interior wall of the tank provide routes for liquid propellant to pass from the proximate peripheral chamber into the duct for passage through the open end of the duct into the proximate axial chamber. Porous screens covering the openings on the surface of the arcuate duct facing the interior wall of the tank retain liquid propellant by surface tension, thereby forming barriers to passage of pressurant gas from the proximate peripheral chamber into the proximate axial chamber as long as sufficient liquid propellant remains in the proximate peripheral chamber to wet the screens.

Capillary-pumping fins are provided on exterior and interior surfaces of the truncated conical partition separating the proximate peripheral chamber from the proximate axial chamber. A capillary-pumping fin projecting into the proximate peripheral chamber from the exterior surface of the truncated conical partition, and a capillary-pumping vane projecting into the proximate peripheral chamber from the transverse partition extending across the tank, cause liquid propellant to be substantially completely withdrawn from the proximate peripheral chamber into the proximate axial chamber before the proximate axial chamber begins to be emptied of liquid propellant. A capillary-pumping fin projecting into the proximate axial chamber from the interior surface of the truncated conical partition causes liquid propellant to be substantially completely withdrawn from the proximate axial chamber into the sponge, before the sponge begins to be emptied of liquid propellant. The sponge is thereby kept substantially filled as long as liquid propellant remains in the proximate axial chamber.

In accordance with the present invention, liquid propellant is emptied in sequence first from the remote chamber, then from the proximal peripheral chamber, and then from the proximal axial chamber, before being emptied from the sponge, as liquid propellant is withdrawn from the tank for delivery to the motor (or motors) of the spacecraft. The sequential emptying of the chambers of the tank in accordance with the present invention minimizes adverse effects on attitude stability of the spacecraft due to migration of liquid propellant within the tank.

In principle, a storage tank having a plurality of sequentially emptying internal chambers according to the present invention could be used in a system for managing some other type of liquid (e.g., water) on board a spacecraft. The following disclosure describes the present invention in terms of a particular application for liquid-propellant management; however, the invention is to be understood broadly in terms of its structural features rather than narrowly in terms of a particular application.

DESCRIPTION OF THE DRAWING

FIG. 1 is a cut-away perspective view of a liquid-propellant tank according to the present invention.

FIG. 2 is a schematic illustration in cross-sectional view of a spacecraft upon which four liquid-propellant tanks according to the present invention are mounted.

FIG. 3 is a fragmentary cross-sectional view along line 3—3 of FIG. 1 showing liquid-propellant fillets formed at the junctions of capillary-pumping fins and a partition within the tank.

FIG. 4 is an elevation view, partially cut away, of a portion of the liquid-propellant tank of FIG. 1.

FIG. 5 is a cross-sectional view along line 5—5 of FIG. 4.

FIG. 6 is a cross-sectional view along line 6—6 of FIG. 5.

FIG. 7 is a cross-sectional view along line 7—7 of FIG. 5.

BEST MODE OF CARRYING OUT THE INVENTION

Illustrated in FIG. 1 is a tank according to the present invention for providing liquid propellant to a motor (or motors) of a spacecraft. The tank comprises a wall 10, which is configured so as to be substantially symmetrical about an axis of elongation extending through poles on opposite ends of the tank. For the particular configuration shown in FIG. 1, the wall 10 is formed from two generally hemispheric end structures attached (as by welding) to opposite ends of a circularly cylindrical middle structure so that the tank is elongate. However, the actual configuration of the tank can vary according to design requirements. Thus, in a particular embodiment the tank could be spherical rather than elongate. In another embodiment, the end structures of the tank could be of generally semi-ellipsoidal configuration rather than specifically hemispheric.

At one pole of the tank, an inlet is provided in the wall 10 through which pressurant gas can be introduced. As shown in FIG. 1, a fitting 11 (which may be conventional) is secured in the inlet, and a gas-flow line 12 is attached to the fitting 11 for introducing pressurant gas through the inlet into the interior of the tank. At an opposite pole of the tank, an outlet is provided in the wall 10 through which liquid propellant can be withdrawn from the tank for delivery to the motor (or motors) of the spacecraft. As shown in FIG. 1, a fitting 13 (which may be conventional) is secured in the outlet, and a liquid-flow line 14 is attached to the fitting 13 for withdrawing liquid propellant from the tank.

The interior of the tank, as defined by the wall 10, is divided into three chambers by a transverse partition 15 and a truncated conical partition 16. The transverse partition 15 is of generally plate-like configuration with a circular periphery that is bonded (as by welding) to the interior surface of the wall 10, and with a central portion that is crowned in the direction of the tank inlet. The truncated conical partition 16 has a smaller-diameter end secured (as by welding) to a flanged portion of a base member 17 positioned circumjacent the tank outlet, and a larger-diameter end secured (as by welding) to the transverse partition 15.

As indicated in FIG. 1, the flanged portion of the base member 17 is configured to conform to the shape of a peripheral portion of the interior surface of the wall 10 circumjacent the tank outlet against which the flanged portion abuts, while a neck portion of the base member 17 is fitted tightly into the tank outlet. The base member 17 is prevented from rotating with respect to the tank outlet by a conventional technique (as by welding). The larger-diameter end of the truncated conical partition 16 is secured to an annular transitional portion of the transverse partition 15 between a generally planar peripheral portion thereof and the crowned central portion thereof. The truncated conical partition 16 is positioned in axial alignment with the axis of elongation of the tank, and is substantially symmetrical about the axis of elongation. In the particular embodiment shown in FIG. 1, reinforcing ribs 18 and 19 are secured (as by welding) around the truncated conical partition 16 to provide structural rigidity.

The transverse partition 15 and the truncated conical partition 16 form three sequentially emptying chambers within the tank. Thus, the side of the transverse partition 15 facing toward the pressurant gas inlet, and the portion of the interior surface of the wall 10 between the pressurant gas inlet and the transverse partition 15, define a so-called "remote" chamber 20. The side of the planar peripheral portion of the transverse partition 15 facing toward the tank outlet, and the portion of the interior surface of the wall 10 between the transverse partition 15 and the tank outlet, as well as the exterior surface of the truncated conical partition 16 facing toward the interior surface of the wall 10, define a so-called "proximate peripheral" chamber 21. The interior surface of the truncated conical partition 16, and the side of the crowned central portion of the partition 15 facing toward the tank outlet, define a so-called "proximate axial" chamber 22.

In the embodiment illustrated in FIG. 1, the transverse partition 15 divides the interior of the tank approximately in half. The position at which the transverse partition 15 is secured to the interior surface of the wall 10 would ordinarily not be critical, and would be selected in any particular application to provide an optimum margin of attitude stability for the spacecraft as liquid propellant is being withdrawn from the tank. Communication between the remote chamber 20 and the proximate peripheral chamber 21 is provided by a port structure 23, which is mounted (as by welding) around an aperture on the transverse partition 15 so as to extend into the proximate peripheral chamber 21. There is no direct communication between the remote chamber 20 and the proximate axial chamber 22. Communication between the proximate peripheral chamber 21 and the proximate axial chamber 22 is provided by a port structure 24, which is attached (as by welding) to the flanged portion of the base member 17 and to the truncated conical partition 16 so as to extend through an aperture in the truncated conical partition 16 into the proximate peripheral chamber 21.

As also illustrated in FIG. 1, a sponge 25 is mounted (as by welding) on the base member 17 so as to communicate with the liquid-propellant flow line 14 through the tank outlet in the wall 10. The sponge 25 may be a conventional device, and in the preferred embodiment comprises a hollow right-circularly cylindrical tube 26 to which planar metal panels 27 are secured (as by welding) in longitudinally extending radial disposition with respect to the axis of the tube 26. The sponge 25 is mounted so that the axis of the tube 26 substantially coincides with the axis of elongation of the liquid-propellant tank. The panels 27 are preferably perforated to permit liquid propellant to flow transversely through the sponge 25 when sufficient liquid propellant is present in the proximate axial chamber 22.

The number of panels 27 in the sponge 25 is determined by the requirement that the maximum spacing between adjacent panels 27 at the radially outward perimeter of the sponge 25 must be a capillary distance. Liquid propellant is pumped by capillary action between the panels 27 toward the exterior surface of the cylindrical tube 26, and thence to the base member 17. Liquid propellant then spreads over the base member 17 to a porous portion thereof for passage into the flow line 14. To provide rigidity for the sponge 25, the panels 27 are sandwiched between cover plates 28 and 29. The cover plate 28 has a central hole aligned with one end of the cylindrical tube 26 to which it is attached, and the cover plate 29 is attached to the other end of the tube 26. Apertures are provided in symmetrical arrangement around the central hole on the cover plate 28 in order to reduce weight. A slotted band 30 encircles the radially outer edges of the panels 27 around the periphery of the sponge 25, and a tab on the outer edge of each panel 27 is received in a corresponding slot on the band 30 so as to maintain substantially uniform angular spacing between adjacent panels 27.

Filling the tank with liquid propellant (which is ordinarily done on earth where the force of gravity is significant) is accomplished by introducing liquid propellant through the tank outlet into the sponge 25. Liquid propellant overflowing from the sponge 25 then begins to fill the proximate axial chamber 22. As the proximate axial chamber 22 is being filled, liquid propellant passes through the aperture in the truncated conical partition 16 into the port structure 24, and then begins to fill the proximate peripheral chamber 21 as well. Eventually, liquid propellant in the proximate axial chamber 22 reaches a maximum "fill level" determined by the amount and pressure of gas trapped between the surface of the liquid propellant and the crowned central portion of the transverse partition 15. In a particular application, a vent having an inlet located adjacent the larger-diameter end of the truncated conical partition 16 could be provided to facilitate filling of the proximate axial chamber 22 to a predetermined "fill level". Similarly, liquid propellant in the proximate peripheral chamber 21 eventually reaches a maximum "fill level" determined by the amount and pressure of gas trapped between the surface of the liquid propellant and the planar peripheral portion of the transverse partition 15. The port structure 23 can be configured and dimensioned to facilitate filling of the proximate peripheral chamber 21 to a predetermined "fill level". When the proximate peripheral and axial chambers 21 and 22 have been filled to their predetermined "fill levels", additional liquid propellant introduced into the tank through the outlet in the wall 10 causes an equivalent volume of liquid propellant to pass via the port structure 23 into the remote chamber 20. Eventually, a desired "fill level" is reached in the remote chamber 20, whereupon filling of the tank with liquid propellant is discontinued.

In operation (e.g., during firing of the spacecraft thrusters, which ordinarily occurs in a low-gravity or substantially zero-gravity environment), liquid propellant is withdrawn from the tank by opening a valve associated with the liquid-flow line 14, and by introducing pressurant gas via the gas-flow line 12 into the remote chamber 20. As liquid propellant is withdrawn through the tank outlet, pressurant gas in the remote chamber 20 forces liquid propellant from the remote chamber 20 via the port structure 23 into the proximate peripheral chamber 21. In the particular embodiment illustrated in FIG. 1, the port structure 23 is a box-like device secured (as by welding) to a surface portion of the transverse partition 15 so as to extend into the proximate peripheral chamber 21. The box-like port structure 23 has an open end whose edges are aligned with the aperture in the transverse partition 15. The location of the aperture in the transverse partition 15 is determined primarily by the configuration and operating characteristics of the spacecraft on which the liquid-propellant tank is mounted.

The particular location of the aperture in the transverse partition 15 (and the concomitant location of the port structure 23) in the embodiment shown in FIG. 1 has been designed for a liquid-propellant storage tank mounted on a spacecraft (viz., a rocket) of the type schematically illustrated in FIG. 2, wherein four substantially identical storage tanks are shown mounted in symmetrical disposition with respect to each other around a spin axis of the spacecraft. As the spacecraft spins, centrifugal force causes liquid propellant in each tank to collect adjacent the portion of the interior surface of the wall 10 located at the greatest radial distance from the spin axis. Accordingly, as shown in FIG. 2, the aperture in the transverse partition 15 in each tank is located adjacent the portion of the interior surface of the wall 10 where liquid propellant tends to collect.

As shown in FIG. 1, the aperture in the transverse partition 15 is rectangular, and is located on the planar peripheral portion of the transverse partition 15 close to the interior surface of the wall 10. The box-like port structure 23 has an open end aligned with the rectangular aperture. Four side walls of the port structure 23 extend into the proximate peripheral chamber 21, and a rectangular end wall forms a closed end of the port structure 23. Liquid propellant passes from the remote chamber 20 through the rectangular aperture into the port structure 23, and then through an aperture (preferably circular) in a side wall of the port structure 23 facing the interior surface of the tank wall 10 into the proximate peripheral chamber 21. A porous screen 31 covers the aperture in the side wall of the port structure 23, and retains liquid propellant by surface tension to form a barrier to passage of pressurant gas from the remote chamber 20 into the proximate peripheral chamber 21 as long as sufficient liquid propellant remains in the remote chamber 20 to wet the screen 31.

A capillary-pumping fin 32 projects outward from the exterior surface of the truncated conical partition 16 into the proximate peripheral chamber 21, and extends along the exterior surface of the partition 16 from a position separated by a capillary distance from the transverse partition 15 to a position separated by a capillary distance from the flanged portion of the base member 17. A capillary-pumping vane 33 projects outward from a surface portion of the planar peripheral portion of the transverse partition 15 into the proximate peripheral chamber 21, and extends along the partition 15 from a position separated by a capillary distance from the interior surface of the wall 10 to a position in contact with (or separated by a capillary distance from) the exterior surface of the truncated conical partition 16.

In operation, as liquid propellant is being withdrawn from the proximate peripheral chamber 21, residual liquid propellant collecting on the surfaces defining the proximate peripheral chamber 21 (i.e., the interior surface of the wall 10, the surface of the planar peripheral portion of the transverse partition 15 from which the vane 33 projects, and the exterior surface of the truncated conical partition 16), as well as on the exterior surfaces of the port structures 23 and 24, migrates to intersections of the fin 32 with the partition 16 and of the vane 33 with the partition 15, where fillets of liquid propellant are formed. The separation between the vane 33 and the fin 32 along the exterior surface of the truncated conical partition 16 is not critical, because capillary-pumping communication between the vane 33 and the fin 32 is provided by a fillet of liquid propellant that forms at the junction of the transverse partition 15 and the truncated conical partition 16. In the particular embodiment shown in FIG. 1, the vane 33 is spaced apart from the fin 32 by a capillary distance.

Similarly, a capillary-pumping fin 34 projects inward from the interior surface of the truncated conical partition 16 into the proximate axial chamber 22, and extends along the partition 16 from a position separated by a capillary distance from the transverse partition 15 to a position separated by a capillary distance from the flanged portion of the base member 17. As liquid propellant is being withdrawn from the proximate axial chamber 22, residual liquid propellant collecting on the interior surface of the truncated conical partition 16 migrates to the intersections of the fin 34 with the interior surface of the truncated conical partition 16, where fillets of liquid propellant are likewise formed. Fillets of liquid propellant formed at the intersections of the capillary-pumping fins 32 and 34 with the truncated conical partition 16 are illustrated in FIG. 3.

The port structure 24, which provides communication between the proximate peripheral chamber 21 and the proximate axial chamber 22, is of arcuate configuration conforming to the curvature of the polar region of the wall 10 adjacent the tank outlet. One end of the port structure 24 is open, and the other end thereof is closed. The open end of the port structure 24 is tightly fitted in the aperture in the truncated conical partition 16, and is secured (as by welding) to the flanged portion of the base member 17 and to the truncated conical partition 16. The aperture in the truncated conical partition 16 is located adjacent the smaller-diameter end thereof, and is of rectangular configuration in conformity with the cross-sectional configuration of the arcuate port structure 24. The closed end of the port structure 24 extends into the proximate peripheral chamber 21, and is separated from the interior surface of the wall 10 by a capillary distance. The separation between the port structure 24 and the wall 10 decreases from the closed end to the open end, thereby providing a capillary channel in which liquid propellant that accumulates on the surfaces defining the proximate peripheral chamber 21 can be pumped toward the aperture in the truncated conical partition 16.

An aperture is provided in a side wall of the port structure 24 facing the tank wall 10 at a position within the proximate peripheral chamber 21 adjacent the open end of the port structure 24. Liquid propellant that is pumped between the port structure 24 and the wall 10 toward the aperture in the truncated conical partition 16 by capillary action enters into the port structure 24 through the aperture in the side wall thereof, and is withdrawn from the port structure 24 through the open end thereof into the proximate axial chamber 22. As illustrated in FIG. 1, a second aperture is provided in the side wall of the port structure 24 adjacent the closed end thereof facing the tank wall 10 in order to facilitate entry into the port structure 24 of liquid propellant that migrates to the interior surface of the wall 10 when the spacecraft on which the tank is mounted is spinning as indicated in FIG. 2. The arcuate length of the port structure 24 is designed so that the aperture adjacent the closed end thereof is at least partially covered by liquid propellant that remains in the proximate peripheral chamber 21 at the end of the final spin phase of the mission of the spacecraft on which the tank is mounted.

A porous screen 35 covers the aperture in the side wall adjacent the open end of the port structure 24, and a porous screen 36 covers the aperture in the same side wall adjacent the closed end thereof. The screens 35 and 36 retain liquid propellant by surface tension, and serve as barriers to passage of pressurant gas from the proximate peripheral chamber 21 into the port structure 24 as long as the porous screens 35 and 36 are wetted with liquid propellant. As further liquid propellant is withdrawn from the tank so that the proximate axial chamber 22 begins to be emptied, pressurant gas passes via the porous screens 35 and/or 36 through the port structure 24 into the proximate axial chamber 22 to force liquid propellant into the sponge 25.

In accordance with the present invention, as liquid propellant is being withdrawn from the tank, the remote chamber 20 becomes substantially completely emptied before the proximate peripheral and axial chambers 21 and 22 begin to be emptied. In this way, the mass of liquid propellant in the proximate peripheral and axial chambers 21 and 22 remains substantially stationary relative to the center of mass of the spacecraft. As liquid propellant migrates within the remote chamber 20 (and even as liquid propellant may slosh within the remote chamber 20 during maneuvering of the spacecraft), the mass of liquid propellant that is free to migrate and the distance of such migration within the tank are limited by the capacity and configuration of the remote chamber 20. Since a significant portion of the total mass of liquid propellant in the tank is constrained within the proximate peripheral and axial chambers 21 and 22, and since migration of liquid propellant within the remote chamber 20 is limited, the effect on attitude stability of the spacecraft due to migration and sloshing of liquid propellant within the tank is minimal.

After the remote chamber 20 has been substantially completely emptied, the proximate peripheral chamber 21 then begins to be emptied. As liquid propellant migrates within the proximate peripheral chamber 21 (and even as liquid propellant may slosh within the proximate peripheral chamber 21), the mass of liquid propellant that is free to migrate and the distance of such migration within the tank are limited by the capacity and configuration of the proximate peripheral chamber 21. Since a significant portion of the liquid propellant remaining in the tank is constrained within the proximate axial chamber 22, and since migration of liquid propellant within the proximate peripheral chamber 21 is limited, the effect on attitude stability of the spacecraft due to migration and sloshing of liquid propellant remaining within the tank is minimal.

After the proximate peripheral chamber 21 has been substantially completely emptied, the proximate axial chamber 22 then begins to be emptied of liquid propellant. The proximate axial chamber 22 is configured so that the center of mass of liquid propellant contained therein is constrained, even if sloshing of liquid propellant within the proximate axial chamber 22 occurs. Consequently, the effect on attitude stability of the spacecraft due to migration and sloshing of liquid propellant within the proximate axial chamber 22 is minimal. Under conditions of low acceleration, liquid propellant is restrained within the trap 25, and migration of liquid propellant within the sponge 25 occurs radially inwardly toward the cylindrical tube 26, which is coaxial with the axis of elongation of the tank. Consequently, migration of liquid propellant within the sponge 25 does not significantly affect attitude stability of the spacecraft.

A detailed view of a portion of the liquid-propellant tank of FIG. 1 is shown in FIG. 4 in which arrows indicate flow paths for the migration of liquid propellant, as follows:

(1) from the remote chamber 20 through the port structure 23 into the proximate peripheral chamber 21;
(2) from the proximate peripheral chamber 21 through the port structure 24 into the proximate axial chamber 22; and
(3) from the interior of the proximate axial chamber 22 into the sponge 25.

The positioning of the capillary-pumping fins 32 and 34, the capillary-pumping vane 33 and the arcuate-shaped port structure 24 with respect to each other and with respect to the truncated conical partition 16 is illustrated in plan view in FIG. 5. A detailed illustration of the attachment (as by welding) of the smaller-diameter end of the truncated conical partition 16 to the flanged portion of the base member 17 is shown in FIG. 6. A cross-sectional view of the open end of the port structure 24 and of the ends of the capillary-pumping fins 32 and 34 in the vicinity of the base member 17 is shown in FIG. 7.

This invention has been described above in terms of a preferred embodiment in which the internal chambers of the liquid-propellant storage tank have particular configurations. However, variations in the configurations of the internal chambers of the tank, as well as alternative techniques for passing liquid propellant sequentially from one chamber to another, would be apparent to practitioners skilled in the art without departing from the principles of the present invention upon perusal of the foregoing description and accompanying drawing. Therefore, the above disclosure is to be understood as being merely illustrative of the invention, which is defined more generally by the following claims and their equivalents.

We claim:
1. A liquid management system for a spacecraft, said system comprising:
 (a) a tank;
 (b) partitions dividing said tank into at least three interior chambers; and
 (c) port structures interconnecting said interior chambers of said tank, said port structures being configured and being positioned adjacent an interior surface of said tank so that said interior chambers can be emptied of liquid in sequence under substantially all conditions of acceleration.
2. The liquid management system of claim 1 wherein said tank is generally symmetric about an axis of symmetry.
3. The liquid management system of claim 2 wherein said tank is elongate along said axis of symmetry.
4. The liquid management system of claim 2 wherein said tank has generally semi-ellipsoidal first and second ends, an inlet for pressurant gas being located in a polar region of the first end of said tank and an outlet for liquid being located in a polar region of the second end of said tank.
5. The liquid management system of claim 4 wherein said tank is elongate along said axis of symmetry, said inlet and outlet being located substantially on said axis of symmetry.
6. The liquid management system of claim 1 wherein said partitions comprise:
 (a) a partition of generally plate-like configuration, a peripheral portion of said plate-like partition being secured to the interior surface of said tank, a first side of said plate-like partition together with a first portion of the interior surface of said tank defining a remote chamber; and
 (b) a partition of generally truncated conical configuration, a wide-diameter end of said truncated conical partition being secured to a second side of said plate-like partition, a narrow-diameter end of said truncated conical partition being fixedly positioned with respect to the interior surface of said tank circumjacent an outlet through which liquid can be withdrawn from said tank, an exterior surface of said truncated conical partition together with a second portion of the interior surface of said tank and an annular portion of said second side of said plate-like partition defining a proximate peripheral chamber, an interior surface of said truncated conical partition together with a central portion of said second side of said plate-like partition defining a proximate axial chamber.

7. The liquid management system of claim 6 wherein an inlet is located in said first portion of the interior surface of said tank, said inlet being connectable to a line through which pressurant gas can be introduced into said remote chamber.

8. The liquid management system of claim 7 wherein said inlet and said outlet are located substantially on an axis of symmetry of said tank.

9. The liquid management system of claim 6 wherein said port structures comprise:
   (a) means secured to said plate-like partition for providing liquid communication between said remote chamber and said proximate peripheral chamber; and
   (b) means secured to said truncated conical partition for providing liquid communication between said proximate peripheral chamber and said proximate axial chamber.

10. The liquid management system of claim 9 wherein the port structure for providing liquid communication between said remote chamber and said proximate peripheral chamber comprises a first porous means to retain liquid, thereby forming a barrier to passage of pressurant gas from said remote chamber into said proximate peripheral chamber as long as sufficient liquid remains in said remote chamber to wet said first porous means.

11. The liquid management system of claim 9 wherein the port structure for providing liquid communication between said proximate peripheral chamber and said proximate axial chamber comprises a second porous means to retain liquid, thereby forming a barrier to passage of pressurant gas from said proximate peripheral chamber into said proximate axial chamber as long as sufficient liquid remains in said proximate peripheral chamber to wet said second porous means.

12. The liquid management system of claim 6 further comprising a base member positioned on said second portion of the interior surface of said tank circumjacent said outlet, the narrow-diameter end of said truncated conical partition being secured to said base member.

13. The liquid management system of claim 12 further comprising sponge means secured to said base member and extending into said proximate axial chamber, said sponge means communicating via said outlet with the line through which liquid can be withdrawn from said tank.

14. The liquid management system of claim 6 further comprising means disposed within said proximate peripheral chamber for forming a fillet of liquid, and for pumping liquid by capillary action from the fillet to said port structure that provides liquid communication between said proximate peripheral chamber and said proximate axial chamber.

15. The liquid management system of claim 14 wherein said means disposed within said proximate peripheral chamber for forming a fillet of liquid comprises a capillary-pumping vane secured to said second side of said plate-like partition and a capillary-pumping fin secured to said exterior surface of said truncated conical partition.

16. The liquid management system of claim 6 further comprising means disposed within said proximate axial chamber for forming a fillet of liquid, and for pumping liquid by capillary action from the fillet toward said outlet.

17. A liquid management system for a spacecraft, said system comprising:
   (a) a tank having an outlet for liquid, said outlet lying on an axis of said tank;
   (b) partitions dividing said tank into at least three interior chambers; and
   (c) port structures interconnecting said interior chambers of said tank, said port structures being configured and positioned so that said interior chambers can be emptied of liquid in sequence under all conditions of acceleration of said tank in directions transverse to said axis.

18. The liquid management system of claim 17 wherein said tank is generally symmetric about said axis.

19. The liquid management system of claim 18 wherein said tank is elongate along said axis.

20. The liquid management system of claim 18 wherein said tank has generally semi-ellipsoidal first and second ends, an inlet for pressurant gas being located in a polar region of the first end of said tank, said outlet for liquid being located in a polar region of the second end of said tank.

21. The liquid management system of claim 20 wherein said tank is elongate along said axis, said inlet and said outlet being located substantially on said axis.

22. The liquid management system of claim 18 wherein said partitions comprise:
   (a) a partition of generally plate-like configuration, a peripheral portion of said plate-like partition being secured to an interior surface of said tank, a first side of said plate-like partition together with a first portion of the interior surface of said tank defining a remote chamber; and
   (b) a partition of generally truncated conical configuration, a wide-diameter end of said truncated conical partition being secured to a second side of plate-like partition, a narrow-diameter end of said truncated conical partition being fixedly positioned with respect to the interior surface of said tank circumjacent an outlet through which liquid can be withdrawn from said tank, an exterior surface of said truncated conical partition together with a second portion of the interior surface of said tank and an annular portion of said second side of said plate-like partition defining a proximate peripheral chamber, an interior surface of said truncated conical partition together with a central portion of said second side of said plate-like partition defining a proximate axial chamber.

23. The liquid management system of claim 22 wherein an inlet is located in said first portion of the interior surface of said tank, said inlet being connectable to a line through which pressurant gas can be introduced into said remote chamber.

24. The liquid management system of claim 23 wherein said inlet and said outlet are located substantially on said axis.

25. The liquid management system of claim 22 wherein said port structures comprise:
   (a) means secured to said plate-like partition for providing liquid communication between said remote chamber and said proximate peripheral chamber; and (b) means secured to said truncated conical partition for providing liquid communication between said proximate peripheral chamber and said proximate axial chamber.

26. The liquid management system of claim 25 wherein the port structure for providing liquid communication between said remote chamber and said proximate peripheral chamber comprises a first porous means to retain liquid, thereby forming a barrier to passage of pressurant gas from said remote chamber into said proximate peripheral chamber as long as sufficient liquid remains in said remote chamber to wet said first porous means.

27. The liquid management system of claim 25 wherein the port structure for providing liquid communication between said proximate peripheral chamber and said proximate axial chamber comprises a second porous means to retain liquid, thereby forming a barrier to passage of pressurant gas from said proximate peripheral chamber into said proximate axial chamber as long as sufficient liquid remains in said proximate peripheral chamber to wet said second porous means.

28. The liquid management system of claim 22 further comprising a base member positioned on said second portion of the interior surface of said tank circumjacent said outlet, the narrow-diameter end of said truncated conical partition being secured to said base member.

29. The liquid management system of claim 28 further comprising sponge means secured to said base member and extending into said proximate axial chamber, said sponge means communicating via said outlet with the line through which liquid can be withdrawn from said tank.

30. The liquid management system of claim 22 further comprising means disposed within said proximate peripheral chamber for forming a fillet of liquid, and for pumping liquid by capillary action from the fillet to said port structure that provides liquid communication between said proximate peripheral chamber and said proximate axial chamber.

31. The liquid management system of claim 30 wherein said means disposed within said proximate peripheral chamber for forming a fillet of liquid comprises a capillary-pumping vane secured to said second side of said plate-like partition and a capillary-pumping fin secured to said exterior surface of said truncated conical partition.

32. The liquid management system of claim 22 further comprising means disposed within said proximate axial chamber for forming a fillet of liquid, and for pumping liquid by capillary action from the fillet toward said outlet.

* * * * *